S. H. Lancaster,
Pawl and Ratchet.

N° 45,616. Patented Dec. 27, 1864.

Witnesses.

Inventor.

UNITED STATES PATENT OFFICE.

SILAS H. LANCASTER, OF LECLAIRE, IOWA.

IMPROVEMENT IN MECHANICAL MOVEMENTS.

Specification forming part of Letters Patent No. 45,616, dated December 27, 1864.

*To all whom it may concern:*

Be it known that I, SILAS H. LANCASTER, of Leclaire, in the county of Scott and State of Iowa, have invented a new and useful Improvement in Mechanical Movements; and I do hereby declare the following to be a full and exact description of the same, reference being had to the accompanying drawings, making part of this specification, in which—

Figure 1:
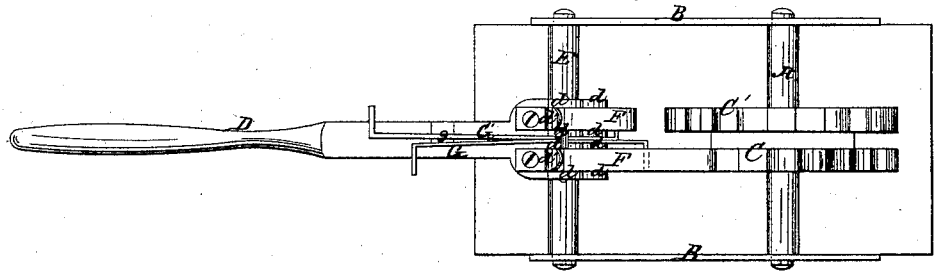
Figure 2:
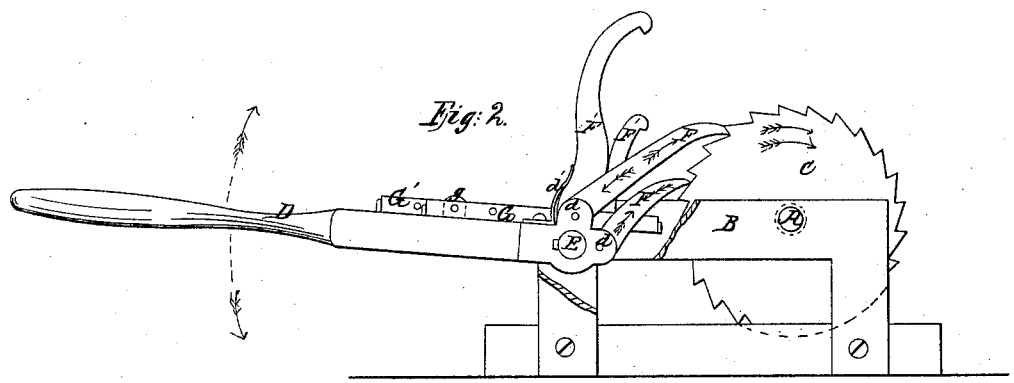
Figure 3:
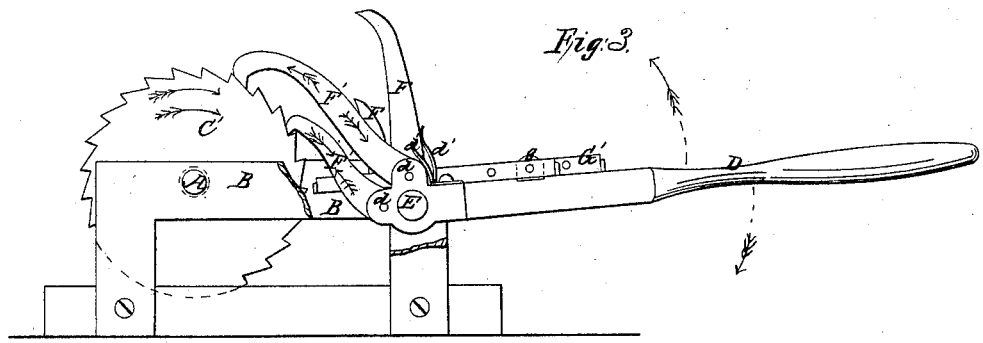

Figure 1 is a plan of an apparatus illustrating my invention. Figs. 2 and 3 are side elevations of the same, illustrating the adaptation of the parts for transmitting motion in opposite directions.

Similar letters of reference indicate corresponding parts in the several figures.

This invention consists in transmitting power to a driving-shaft, so as to rotate it in either direction, through the medium of pawls, two of which are adapted to rotate the shaft in one direction by an impelling or pushing force applied to a keyed ratchet-wheel, and two other pawls to turn the said shaft in an opposite direction by a pulling or drawing force, applied to another keyed ratchet-wheel, the pawls being adjustable in the manner to be hereinafter described, in order that one pair may be thrown out of connection with its ratchet-wheel while the other pair is in operation.

The following description will enable others skilled in the art to which my invention appertains to fully understand and use the same.

In the accompanying drawings, A is a driving-shaft, journaled in the rigid frames B B, or otherwise, and employed to transmit motion from any motor to a propeller, locomotive-cranks, or any mechanical contrivance whose motion needs to be reversed at times for purposes which are well understood. Upon the shaft A are keyed two ratchet-wheels, C C', the teeth of which are cut tangentially, those on one wheel projecting in an opposite direction from those on the other.

D is a lever fulcrumed upon a journaled shaft, E, and vibrated by a suitable connection with a steam-engine, or in any other way. The lever D is formed with suitable jaws, d, for the attachment by pivots of pawls F F and F' F'. The pawls F F are placed one above the other, are of common construction, and are caused to rotate the wheel C and shaft A, in the direction indicated by the red and blue arrows, in Fig. 2, by the vibration of the lever D, they being adapted to alternately engage with the teeth of and be forced against the said wheel C. The pawls F' F' are also situated one above the other, and are formed with hooked ends, which are alternately caused to catch into the teeth of the wheel C' by the vibration of the lever D. Their manner of operation is clearly indicated by the red and blue arrows in Fig. 3, the rotation of the shaft A produced by their action being reverse to that produced by the pawls F.

Now, it is apparent that when the pawls F are in connection with the wheel C they would serve to lock the shaft against the action of the pawls F' upon the wheel C', and hence I employ adjustable rods G G, the ends of which are hooked so as to pass beneath the pawls F F', respectively, and admit of either pair being thrown out of connection with its wheel C or C'. The rods rest upon the lever D, and may each be retained in a retracted condition by a pin on a lug, $g$. This adjustment of the rods enables the operator to reverse the motion of an engine or of its cranks without reversing the piston.

By the employment of springs or retainers $d'$ the pawls F F may be held in such position, when retracted from the ratchet-wheels, that by simply advancing the retracting rods G G' toward the wheels the pawls will fall to the operating position.

Having thus described my invention, the following is what I claim as new and desire to secure by Letters Patent:

The reversing-rods G G', adapted to retain one pair of pawls out of connection with its ratchet-wheel while the other pair is in operation, substantially as described.

The above specification of my improvement in mechanical movements signed this 22d day August, 1864.

SILAS H. LANCASTER.

Witnesses:
C. D. SMITH,
OCTAVIUS KNIGHT.